US006654149B1

United States Patent
Sheng

(10) Patent No.: US 6,654,149 B1
(45) Date of Patent: Nov. 25, 2003

(54) FLOATING LIGHT SOURCE MODULE FOR FILM SCANNERS

(75) Inventor: Thomas Sheng, Hsinchu (TW)

(73) Assignee: Avision Inc., Hsin-Chu Hsien (TW)

( * ) Notice: Subject to any disclaimer, the term of this patent is extended or adjusted under 35 U.S.C. 154(b) by 0 days.

(21) Appl. No.: 09/541,007

(22) Filed: Mar. 31, 2000

(30) Foreign Application Priority Data

Sep. 20, 1999  (TW) ......................................... 88116463 A

(51) Int. Cl.[7] .............................. H04N 1/04; H04N 1/40; H01L 27/00; H01J 5/14
(52) U.S. Cl. ....................... 358/474; 358/475; 358/494; 358/497; 358/482; 358/483; 358/471; 250/208.1; 250/235; 250/236
(58) Field of Search ................................ 358/474, 497, 358/494, 483, 482, 475, 471; 250/208.1, 235, 236

(56) References Cited

U.S. PATENT DOCUMENTS

| 5,610,731 | A | * | 3/1997 | Itoh | 358/496 |
| 5,734,483 | A | * | 3/1998 | Itoh | 358/496 |
| 5,801,851 | A | * | 9/1998 | Sheng | 358/497 |
| 6,026,261 | A | * | 2/2000 | Peng | 399/211 |

* cited by examiner

Primary Examiner—Edward Coles
Assistant Examiner—Houshang Safaipour
(74) Attorney, Agent, or Firm—Winston Hsu

(57) ABSTRACT

The separation between the light source module for a film scanner and the protection window for pressing against the film document is minimized to increase light intensity by inserting low friction material between the scanning light source module and the protection window. The pressure is exerted by means of a spring or gravity.

17 Claims, 9 Drawing Sheets

FLOATING LIGHT SOURCE MODULE FOR FILM SCANNERS

BACKGROUND OF THE INVENTION (1) Field of the Invention

This invention relates to scanners, in particular to scanners for films.

(2) Description of the Related Art

A scanner for films generally has two modules: the light source module and the optical module. The light source module includes the light source and a carriage for the light source. The optical module is for processing the optical image signal and includes a frame and reflecting mirrors. In conventional scanners for slides, transparencies, photographic film negatives, X-ray films, etc., the light source module and the optical module are two separate entities. The light source module is fixed over the transparent scanning window and the protection window. The optical module is placed underneath the transparent scan window and the protection window. The protection window protects the light source and presses the film document against the scan window. The light source is mounted on the carriage and slides along a rail. The lowest point of the light source module must clear the protection window by a certain distance to allow for structural variations. A typical minimum clearance is 1.5 mm. Because of this 1.5 mm clearance, the light source cannot be in intimate contact with the protection window and the light source intensity is weakened.

FIG. 1 shows a prior art optical system of a scanner for films. A light source 10 is mounted on a base 12 which is attached to a carriage 17. The carriage can slide along a rail 14. The light source 10 emits a light beam 15 through a protection window 16 which is used to press a film document (not shown) against a scanning window 18. The light beam transmitted past the scanning window 18 is incident on an optical module 11, which has mirrors for further processing the optical signals. The base 12 has a light source 10 which is customarily softened with translucent glass placed underneath the base 12. The light beam emitted from the light source 10 passes through the protective window 16 to scan the film document placed over the scan window 18. The light beam now contains optical signals for incidence on the first mirror 13 of the optical module 11.

FIG. 2 shows another side view of FIG. 1. The carriage 17 supports a guide rod 14 on its right side and is attached to a module 12 for housing a light source 10 along its length. The carriage 17 slides along the guide 14. Underneath the light source module 12 is the protection window 16 and the scan window 18 on which a film document (not shown) is placed. Below the scan window 18 is the optical module 11.

FIG. 9 shows another prior art scanning system for film documents. The carriage 27 also functions as the support for the light source 10, which is hanging uncovered directly without a housing as shown in FIG. 10, and is capable for sliding along the guide rail 14. Underneath the protection window 26 is the scan window 18. The light beam 15 transmits through the protection window 26, the film document (not shown) and the scan window 18 to reach the optical module 11. The scan signal is reflected by the mirror 13 for further signal processing. The closest point between the lowest point of the light source 10 and the surface of the protection window 26 is indicated by the distance 284.

Due to manufacturing variations in either the structure of FIG. 1 or FIG. 9, the dimensions of different components may fluctuate somewhat. To allow for such fluctuations, the common practice is to provide a clearance 184 in FIG. 1 and 284 in FIG. 9 of at least 1.5 mm between the lowest point of the light source 10 and the protection window 16 to avoid rubbing the light source 10 against the protection window 16.

SUMMARY OF THE INVENTION

An object of this invention is to increase the light intensity of the scanner. Another object of this invention is to place the light source module as close to the optical module as possible. These objects are achieved by pushing the light source module against the optical module by means of spring action or by gravity. Separation between the light source module and the protection window pressing the document to be scanned is minimized to increase light intensity by inserting low friction material between the light source module and the protection window.

DETAILED DESCRIPTION OF THE INVENTION

Figure 1:
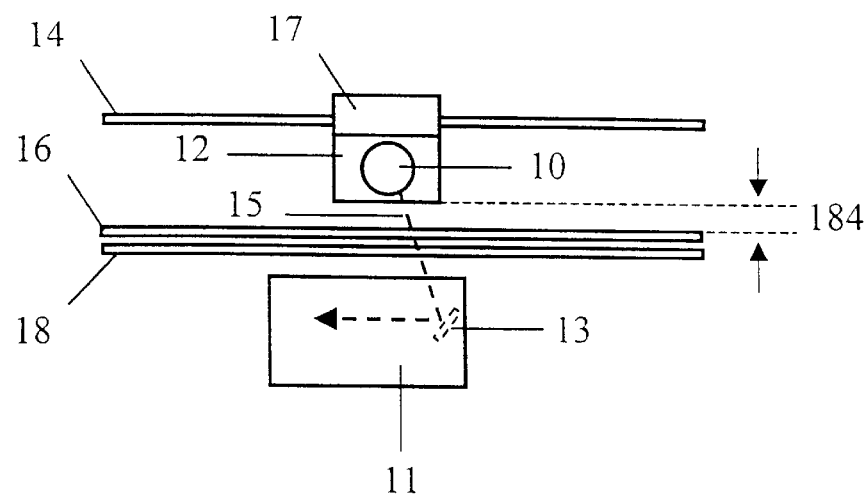
FIG. 1 shows the side view of a prior art optical system of a scanner for films.
Figure 2:
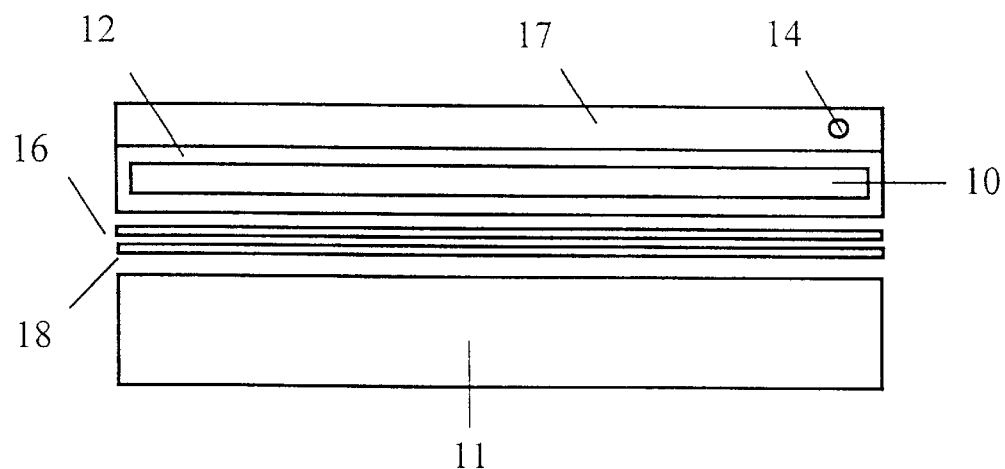
FIG. 2 shows the another side view of the optical system shown in FIG. 1.
Figure 3:
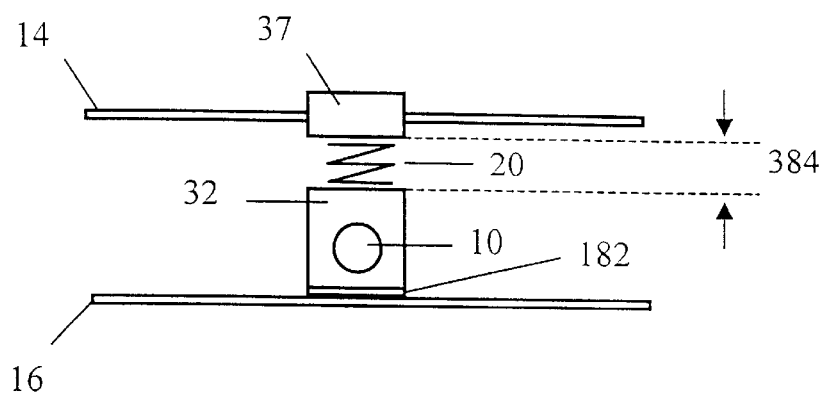
FIG. 3 shows an embodiment of the light source module of the present invention.

FIG. 3 shows the side view of the first embodiment of the present invention. A carriage 37 provides scanning function by sliding along a rail 14. The light source module 32 houses a light source 10 to provide soft lighting. The protection window 16 protects the light source module 32 and presses against the film (not shown) to be scanned. A spring 20 is used to press the light source module 32, and is placed between the carriage 37 and the light source module 32. To allow the light source module 32 to slide over the protection window 16, two friction coefficient linings 182 are placed under the light source module 32 to reduce the friction between the sliding fight source module 32 and the protection window 16.

Figure 4:
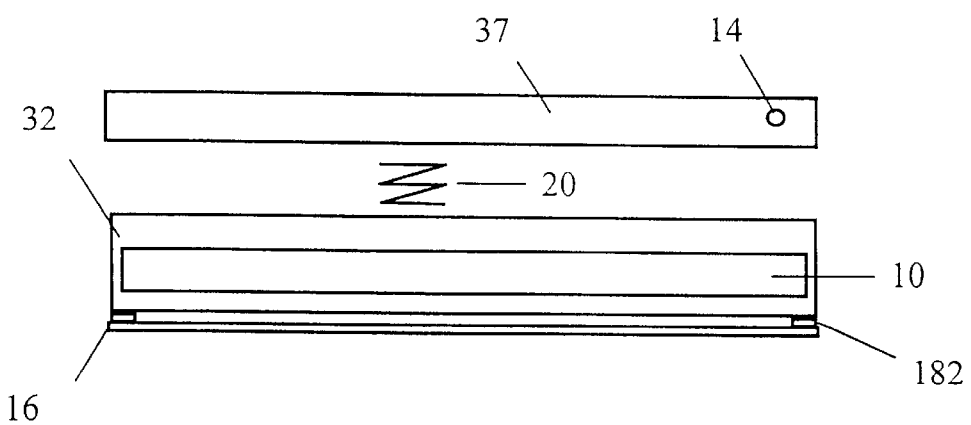
FIG. 4 shows another side view of the light module shown in FIG. 3.

FIG. 4 shows another side view of the structure shown in FIG. 3. The sliding carriage 37 has guide rod 14. The light source module 32 encloses the one light source 10 to produce soft light. The protection window 16 protects the light source module 32 and presses the film document (not shown) to be scanned. The elastic element 20 such as a spiral spring is placed between the carriage 37 and the light source module 32 to provide elastic coupling between the light source module 32 and the carriage 37, thus providing smooth sliding action of the light source module 32 over the protection window 16. The low friction pads 182 along the two sides of the light source module 32 allow the light source module 32 to slide smoothly over the protection window 16.

Figure 5:
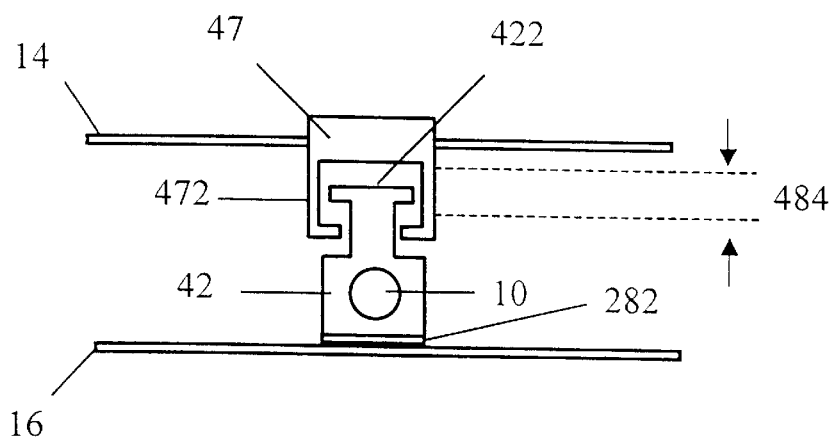
FIG. 5 shows a second embodiment of the present invention.

FIG. 5 shows the side view of a second embodiment of the present invention. A carriage 47 can slide back and forth along a guide rail 14 for scanning. The light source module 42 houses a light source 10 to provide soft lighting. The protection window 16 protects the light source module 42 and presses against the film (not shown) to be scanned. The light module 42 has a T-bar head 422 which is clamped between the claws 472 of the carriage 47. Thus the light source module 42 is coupled to the lower part of the carriage 47. The light source module 42 rests on the protection window by gravity and slides freely. The clearance 484 between the bottom of the claw-shape carriage 47 and the top of the T-bar of the light source module 42 allows for fluctuations in the dimensions of the different components of the structure. Two low friction linings 282 are placed under the light source module 42 to reduce friction for the light source module 42 to slide over the protection window 16.

Figure 6:
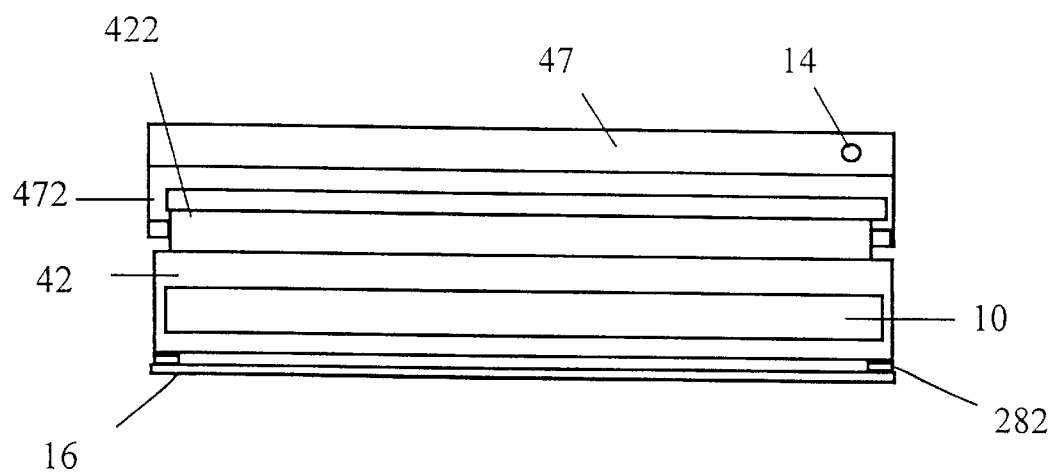
FIG. 6 shows another side view of the structure shown in FIG. 5.

FIG. 6 shows another side view of FIG. 5 The sliding carriage 47 has a guide rod 14. The light source module 42 encloses a light source 10 to produce soft lighting and is clamped by the carriage 47 by the claws 472. The protection window 16 protects the light source module 42 and presses the film document (not shown) to be scanned. The weight of the light source module 42 presses against the protection window 16 by gravity. The low friction pads 282 along the two sides of the light source module 42 allow the light source module 42 to slide smoothly over the protection window 16.

Figure 7:
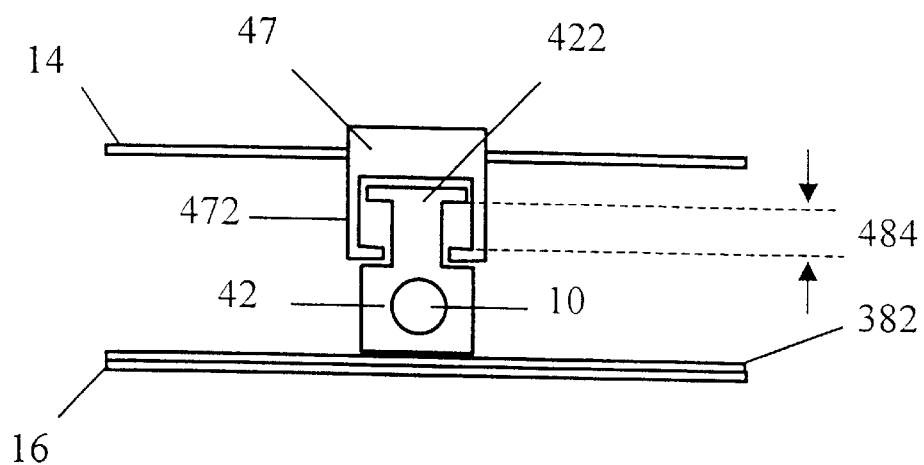
FIG. 7 shows a third embodiment of the present invention.
Figure 8:
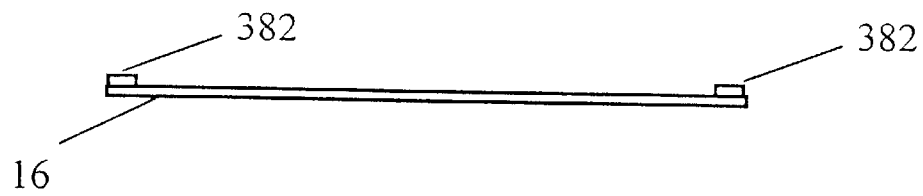
FIG. 8 shows another side view of the structure shown in FIG. 7.

FIG. 7 shows a third embodiment of the present invention. The structure is similar to that of FIG. 5 except that the low friction pads 382 are placed over the protection window 16 instead of attaching to the light source module 42. FIG. 8 shows another side view of FIG. 7. Note that the low friction pads 382 are placed over the protection window 16.

Figure 9:
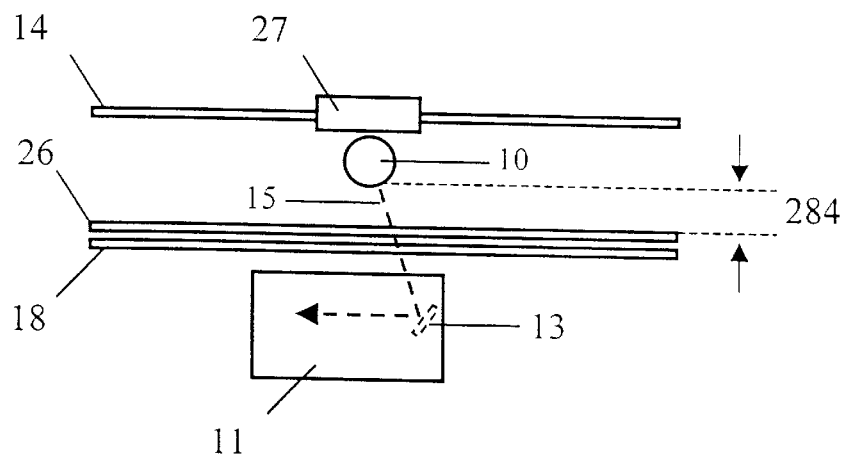
FIG. 9 shows a second prior art optical system.
Figure 10:
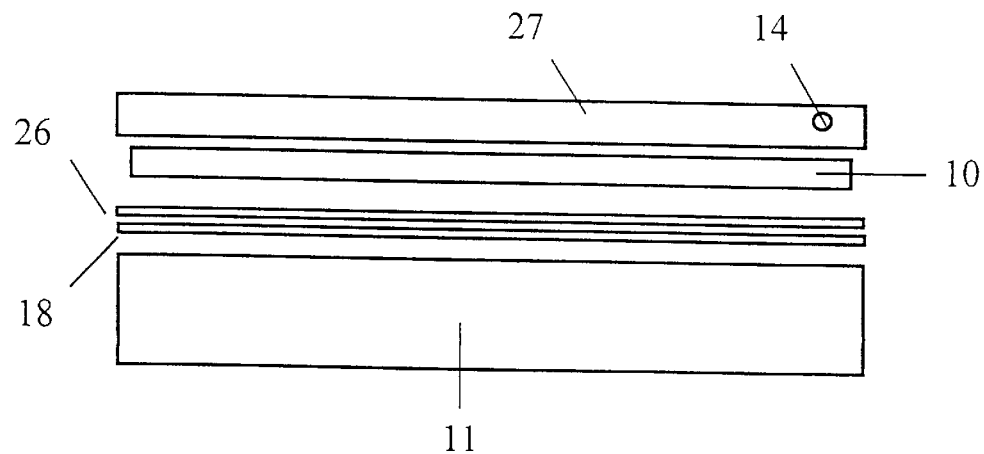
FIG. 10 shows a side view of the structure shown in FIG. 9.
Figure 11:
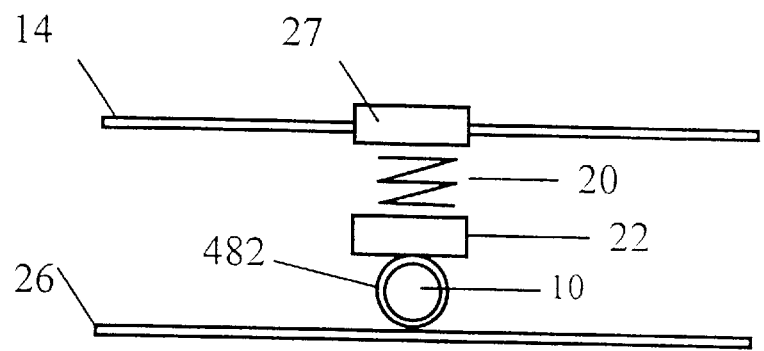
FIG. 11 shows a fourth embodiment of the present invention.

FIG. 11 shows a fourth embodiment of the present invention. The structure is an improvement over the prior art structure shown in FIG. 9. The carriage 27 is capable of sliding along a guide rail 14. The light source 10 is hanging uncovered on a light source plate 22 without being enclosed. The light source plate 22 is coupled to the carriage 27 through a spring 20. The light source 10 is coated with two rings of low friction layer 482 by means of electrolysis, painting, wrapping, etc. to allow the light source plate 22 to slide smoothly over the protection window 26.

Figure 12:
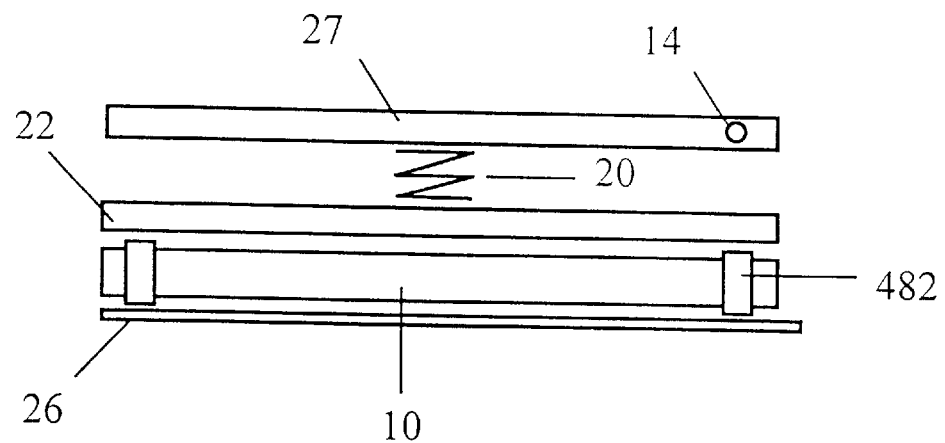
FIG. 12 shows another side view of the structure shown in FIG. 11.

FIG. 12 shows another side view of FIG. 11. The carriage 27 supports a guide rod 14 on its right side. The light source 10 hangs uncovered under the light source plate 22. The elastic element 20 placed between the carriage 27 and the light source plate 22 provides smooth sliding action of the light source plate 22 over the protection window 26. The low friction rings 482 of the light source 10 allow the light source plate 22 to slide smoothly over the protection window 16.

Figure 13:
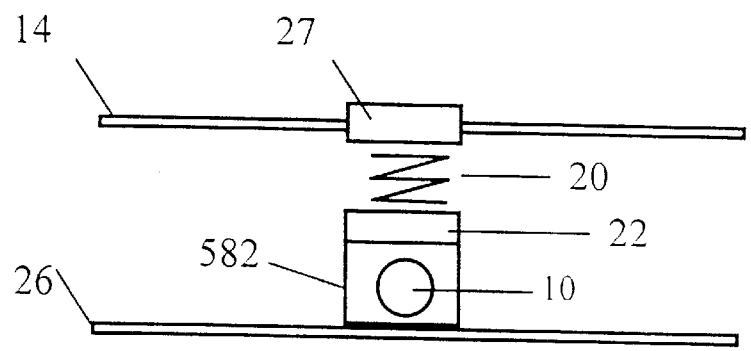
FIG. 13 shows a fifth embodiment of the present invention.

FIG. 13 shows a fifth embodiment of the present invention. The structure is similar to FIG. 11, except that a sidewall 582 is erected at two ends of the light source 10 and is made of low friction material to allow smooth sliding of the light source plate 22 over the protection window 26.

Figure 14:
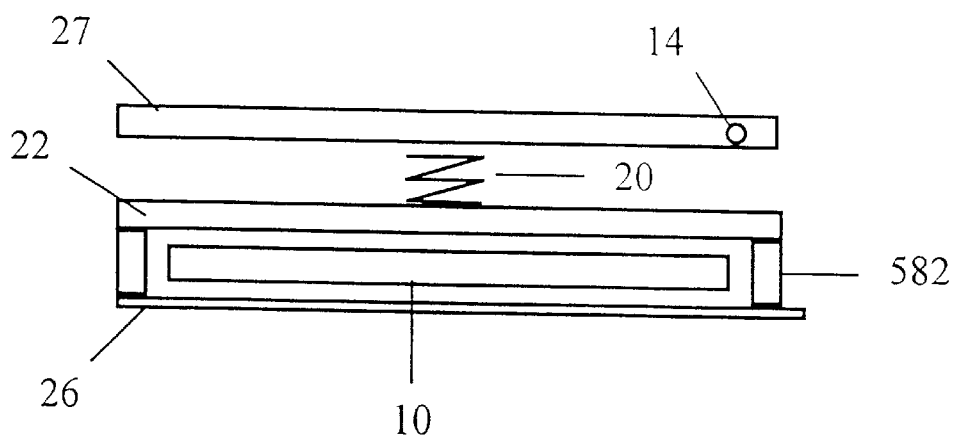
FIG. 14 shows another side view of the structure shown in FIG, 13.

FIG. 14 shows another side view of FIG. 13. The carriage 27 supports a guide rod 14 on its right side. The light source 10 hangs bare on the light source plate 22. The elastic element 20 placed between the carriage 27 and the light source plate 22 provides smooth sliding action of the light source 10 over the protection window 16. The low friction walls 582 allow the light source plate 22 to slide smoothly over the protection window 16.

Figure 15:
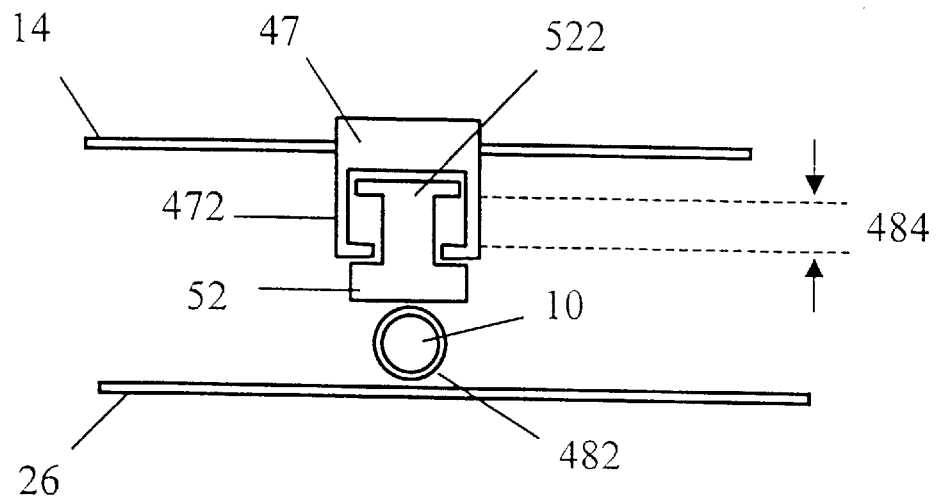
FIG. 15 shows a sixth embodiment of the present invention.

FIG. 15 shows a sixth embodiment of the present invention. The difference between FIG. 15 and FIG. 11 is that no elastic spring 20 is used. Instead, a T-bar light source plate 52 is clamped by a carriage 47 to replace the elastic spring. The carriage 47 is capable of sliding along a guide rail 14. The light source 10 hangs uncovered on the light source plate without being enclosed. The light source plate 22 has a T-bar head 522, which is clamped between the claws 472 of the carriage 47. Thus the light source plate 52 is coupled to the lower part of the carriage 47. The light source 10 rests on the protection window by gravity over the protection window 26. The light source 10 is wrapped with a layer of low friction rings 482 to allow the light source 10 to slide smoothly over the protection window 16.

Figure 16:
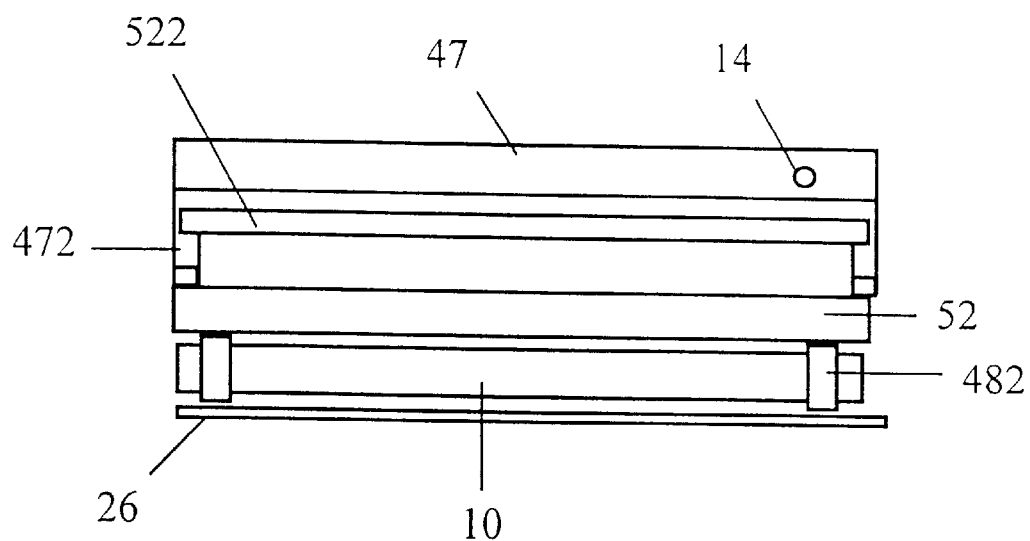
FIG. 16 shows another side view of the structure shown in FIG. 15.

FIG. 16 shows another side view of the structure shown in FIG. 15. The carriage 47 supports a guide rod 14 on its right side. The light source 10 hangs bare on the light source plate 52 and provides a soft lighting. The protection window 16 protects the light source 10 and presses the film document (not shown) to be scanned. The light source plate has a T-bar head 522 which is clamped by the claws 472 of the carriage 47. The coupling between the T-bar head 522 and the claws 472 renders the light source plate 52 to follow the movement of the carriage 47. The light source 10 presses the protection window 16 by gravity. The light source is wrapped with low friction material 482 at the two ends to allow the light source 10 to slide smoothly over the protection window 16.

Figure 17:
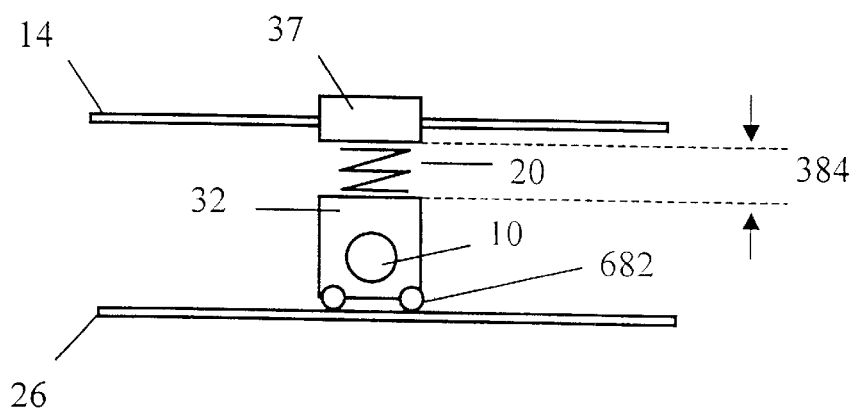
FIG. 17 shows a seventh embodiment of the present invention.
Figure 18:
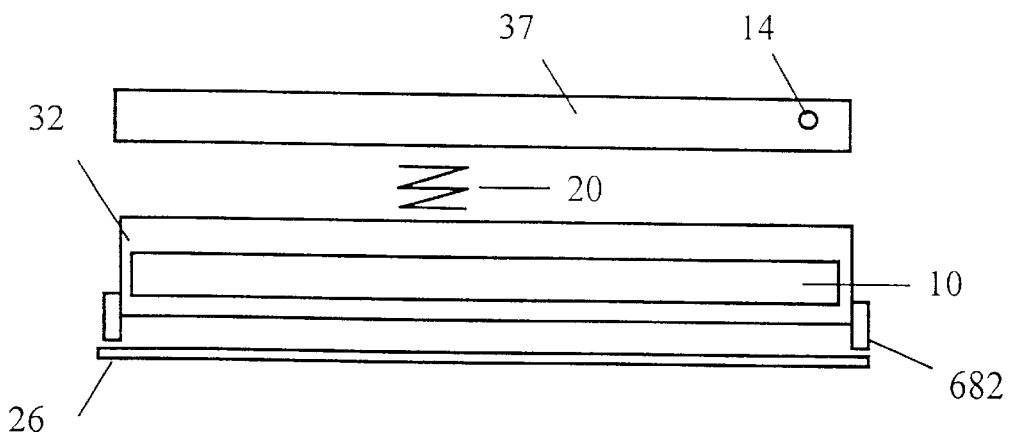
FIG. 18 shows another side view of the structure shown in FIG. 17.

FIG. 17 shows a seventh embodiment of the present invention. The difference between this structure and FIG. 3 is that light source module 32 is supported by four wheels 682 which can roll along the direction of a guide rod 14 and provides low friction to the sliding movement for the light source to slide over the protection window. FIG. 18 shows another side view of FIG. 17 showing the four wheels located at the four corners of the light source module 32.

In conventional scanners, the protection window 15 is typically 2 mm thick. Typical tolerance 184 between the protection window 16 and the lowest point of the light source module is 1.5 mm. In the present invention, the distance between the protection window 16 and the light source module is less than 0.2 mm. The light intensity is inversely proportional to the square of the distance from the light source. The former intensity is $1/(1.5+2)^2=1/12.25$. For the present invention, the intensity is proportional to $1/(0.2+$ $2)^2=1/4.84$. In comparison, the light intensity of the present invention is stronger by a factor of $(1/4.84)/(1/12.25)=2.53$. It shows that the present invention can fully utilize the available energy. In addition, due to increased light intensity, the exposure time is reduced, and the scanning speed can be increased. In conventional technology, more than one light bulb may be used to increase the light intensity. Reflectors may also be used to increase the light intensity. These techniques may also be incorporated with the present invention. On a one-on-one comparison, the present invention is far superior to the conventional techniques. Besides, the present invention allows the light source module to be in intimate contact with the protection window to avoid any error caused by fluctuation in manufacturing process.

The elastic element 20 described in the foregoing paragraphs uses a spiral spring as an example. Other kinds of elastic elements such as C-spring, S-spring, rubber, etc. may also be used.

While particular embodiments of the invention have been described, it will apparent to those skilled in the art that various modifications may be made in the embodiments without departing from the spirit of the present invention. Such modifications are all within the scope of this invention.

What is claimed is:

1. A light source module for a film scanner having a scan window over which a film document lies, a protection window for protecting said light source module and pressing said film document against said scan window, and an optical module for sensing and processing optical signals transmitted through said film document, said light source module comprising:

a light source for transmitting light through said film document;

a carriage for moving said light source;

a guide for said carriage;

means for pressing said light source module toward said protection window and toward said optical module; and low friction material inserted between the lowest point of said light source and said protection window and preventing said light source from rubbing said protection window when said light source module is scanning over said protection window.

2. A light source module as described in claim 1, wherein said means for pressing is an elastic spring.

3. A light source module as described in claim 1, wherein said means for pressing is gravity of the light source module.

4. A light source module as described in claim 1, wherein said low friction material is attached to the bottom edges of said light source module so as not to block any light emitted from said light source.

5. A light source module as described in claim 1, wherein said light source is enclosed in a housing of said light source module.

6. A light source module as described in claim 1, wherein said light source is hanging uncovered in said light source module without being enclosed.

7. A light source module as described in claim 3, wherein said light source module has a T-bar top, and said carriage has a claw to clamp said T-bar top.

8. A light source module as described in claim 6, wherein said low friction material wraps around said light source.

9. A light source module as described in claim 1, wherein said low friction material is applied from a process selected from the group consisting of painting, electrolysis and wrapping.

10. A light source module as described in claim 1, wherein elastic spring is selected from the group consisting of spiral spring, C-spring, S-spring and rubber.

11. A light source module as described in claim 1, wherein said light source and said protection window are separated by a distance less than 1.5 millimeters.

12. A light source module as described in claim 1, wherein said light source comprises at least one light bulb.

13. A light source module as described in claim 1, wherein said low-friction material comprises more than one rollers mounted on said light source module.

14. A light source module as described in claim 13, wherein there are four said rollers.

15. A light source module for a film scanner having a scan window over which a film document lies, a protection window for protecting said light source module and pressing said film document against said scan window, and an optical module for sensing and processing optical signals transmitted through said film document, said light source module comprising:

a light source for irradiating said film document;

a carriage for moving said light source;

a guide for said carriage;

means for pressing said light source module toward said protection window; and low friction material inserted between the lowest point of said light source and said protection window and preventing said light source from rubbing said protection window when said light source module is scanning over said protection window, wherein said means for pressing is gravity of the light source module.

16. A light source module as described in claim 15, wherein said light source module has a T-bar top, and said carriage has a claw to clamp said T-bar top.

17. A light source module for a film scanner having a scan window over which a film document lies, a protection window for protecting said light source module and pressing said film document against said scan window, and an optical module for sensing and processing optical signals transmitted through said film document, said light source module comprising;

a light source for irradiating said film document;

a carriage for moving said light source;

a guide for said carriage;

means for pressing said light source module toward said protection window; and low friction material Inserted between the lowest point of said light source and said protection window and preventing said light source from rubbing said protection window hen said light source module is scanning over said protection window, wherein said light source is hanging uncovered in said light source module without being enclosed, and said low friction material wraps around said light source.

* * * * *